(12) United States Patent
Saeda et al.

(10) Patent No.: US 12,019,930 B2
(45) Date of Patent: Jun. 25, 2024

(54) IMAGE FORMING APPARATUS, RECORDING MEDIUM WITH IMAGE PROCESSING PROGRAM RECORDED THEREON, AND IMAGE PROCESSING METHOD

(71) Applicant: SHARP KABUSHIKI KAISHA, Sakai (JP)

(72) Inventors: Masao Saeda, Sakai (JP); Yasuhiro Nakai, Sakai (JP); Kohichi Murakami, Sakai (JP); Yasutomo Hayano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/232,851

(22) Filed: Aug. 11, 2023

(65) Prior Publication Data

US 2024/0094964 A1 Mar. 21, 2024

(30) Foreign Application Priority Data

Sep. 21, 2022 (JP) ................................. 2022-150005

(51) Int. Cl.
*G06F 3/12* (2006.01)

(52) U.S. Cl.
CPC .......... *G06F 3/1256* (2013.01); *G06F 3/1243* (2013.01); *G06F 3/1255* (2013.01); *G06F 3/1279* (2013.01); *G06F 3/128* (2013.01); *G06F 3/1204* (2013.01)

(58) Field of Classification Search
None
See application file for complete search history.

(56) References Cited

U.S. PATENT DOCUMENTS 11,562,516 B2 * 1/2023 Yamada ............... G06V 40/172
2010/0088617 A1 * 4/2010 Watanabe ............... G06T 11/60
715/810

FOREIGN PATENT DOCUMENTS

JP 4987538 B2 7/2012

* cited by examiner

*Primary Examiner* — Darryl V Dottin
(74) *Attorney, Agent, or Firm* — ScienBiziP, P.C.

(57) ABSTRACT

An image forming apparatus classifies, among a plurality of pieces of image data, one or more pluralities of pieces of image data into one or more groups, each including a plurality of pieces of similar image data, the one or more pluralities of pieces of image data each satisfying a corresponding predetermined classification condition for grouping similar images, classifies one or more pieces of image data not satisfying the classification condition as one or more pieces of normal image data, generates one or more pieces of similar image display information corresponding to the one or more groups obtained by classification, generates one or more normal thumbnail images corresponding to the one or more pieces of normal image data obtained by classification, and displays the one or more pieces of similar image display information and the one or more normal thumbnail images that are generated in a manner that allows selection operation.

8 Claims, 15 Drawing Sheets

IMAGE FORMING APPARATUS, RECORDING MEDIUM WITH IMAGE PROCESSING PROGRAM RECORDED THEREON, AND IMAGE PROCESSING METHOD

INCORPORATION OF APPLICATION/PRIORITY

This application claims priority based on Japanese Patent Application No. 2022-150005 filed in Japan on Sep. 21, 2022. By referring to this, all contents thereof are incorporated into this application.

BACKGROUND ART

Technical Field

The present disclosure relates to an image forming apparatus such as a digital copying machine or a multifunction peripheral, a recording medium with an image processing program recorded thereon, and an image processing method.

Related Art

An image forming apparatus, such as a multifunction peripheral, that is installed in a public place such as a convenience store provides a print service for printing image data such as a photograph stored in a mobile terminal device such as a smartphone of a user or an external recording medium such as an SD memory card or a USB flash drive.

In such a print service, the image forming apparatus inputs a plurality of pieces of image data to the mobile terminal device through short-range wireless communication such as wireless LAN communication or into the external recording medium by inserting the external recording medium such as the SD memory card or the USB flash drive into a data inputter such as a memory slot.

The image forming apparatus to which the plurality of pieces of image data are input generates, for example, thumbnail images corresponding to the plurality of pieces of image data, and displays the generated thumbnail images on a display screen of a display in a manner that allows selection operation. Upon receiving the selection operation on the thumbnail images from a user, the image forming apparatus prints the pieces of image data corresponding to the thumbnail images for which the selection operation has been received.

In such an image forming apparatus, in displaying the thumbnail images, for example, there are a large number of pieces of image data of similar images (captured in a short period of time from a similar angle) in an identical situation (scene, picture) due to a burst capture function (a function of capturing a series of images in quick succession) of a camera of a mobile terminal device, and as a result, a large number of thumbnail images are displayed on the display screen. This leads to time and effort for the selection operation where the user selects thumbnail images the user wants from a large number of similar thumbnail images. In addition, though in recent years an automatic selection function is generally used that allows artificial intelligence (AI) to automatically select image data considered to be wanted by a user, the images selected by AI are not necessarily wanted by the user. Alternatively or additionally, it takes time to process the image data, which makes the user wait accordingly.

Therefore, it is desirable to allow a user to efficiently, in a short period of time, select pieces of image data wanted by the user from a large number of pieces of similar image data in an identical situation.

In this regard, it has been known that images are input, imaging dates and times are detected from supplementary information of the input images, a imaging date range of the images is determined based on the detected imaging dates and times, a selection unit of the images and a placement page unit of an album corresponding to the selection unit of the images are determined based on the determined imaging date range, selection of images to be placed in the album for each determined selection unit is received, and album data in which images for each selection unit whose selection has been received are arranged for each corresponding placement page unit are created according to a template corresponding to the number of images selected for each placement page unit.

However, the known configuration is for creating album data, and does not allow the user to efficiently, in a short period of time, select pieces of image data wanted by the user from a large number of pieces of similar image data.

It is an object of the present disclosure to provide an image forming apparatus, a recording medium with an image processing program recorded thereon, and an image processing method that allows a user to efficiently, in a short period of time, select pieces of image data wanted by the user from a large number of pieces of similar image data in an identical situation.

In order to solve the above problems, the present disclosure provides the following image forming apparatus, recording medium with an image processing program recorded thereon, and image processing method.

SUMMARY (1) Image Forming Apparatus

An image forming apparatus according to the present disclosure is an image forming apparatus that prints a piece of image data selected from a plurality of pieces of image data that are input, the image forming apparatus comprising a controller, wherein the controller classifies, among the plurality of pieces of image data, a plurality of pieces of image data satisfying a predetermined classification condition for grouping similar images, as a group of a plurality of pieces of similar image data, classifies a piece of image data not satisfying the classification condition as a piece of normal image data, generates a piece of similar image display information corresponding to the group obtained by classification for each group, generates a normal thumbnail image corresponding to the piece of normal image data obtained by classification, and displays the generated piece of similar image display information and the generated normal thumbnail image in a manner that allows selection operation.

(2) Recording Medium with an Image Processing Program Recorded Thereon

A computer-readable recording medium according to the present disclosure is a computer-readable recording medium with an image processing program recorded thereon, the image processing program including a classification control step of classifying, among a plurality of pieces of image data, a plurality of pieces of image data satisfying a predetermined classification condition for grouping similar images as a group of a plurality of pieces of similar image data, and classifying a piece of image data not satisfying the classification condition as a piece of normal image data, a similar image display information generation control step of generating a piece of similar image display information corresponding to the group obtained by classification in the classification control step for each group, a thumbnail image generation control step of generating a normal thumbnail image corresponding to the piece of normal image data obtained by classification in the classification control step, and a display control step of displaying the piece of similar image display information generated in the similar image display information generation control step and the normal thumbnail image generated in the thumbnail image generation control step in a manner that allows selection operation.

(3) Image Processing Method

An image processing method according to the present disclosure is an image processing method performed by a computer, the method including classifying, among a plurality of pieces of image data, a plurality of pieces of image data satisfying a predetermined classification condition for grouping similar images as a group of a plurality of pieces of similar image data, and classifying a piece of image data not satisfying the classification condition as a piece of normal image data, generating a piece of similar image display information corresponding to the group obtained by classification in the classifying for each group, generating a normal thumbnail image corresponding to the piece of normal image data obtained by classification in the classifying, and displaying the piece of similar image display information generated in the generating of the piece of similar image display information and the normal thumbnail image generated in the generating of the normal thumbnail image in a manner that allows selection operation.

According to the present disclosure, it is possible to allow a user to efficiently, in a short period of time, select image data wanted by the user from a large number of pieces of similar image data in an identical situation.

DESCRIPTION OF PREFERRED EXAMPLES

An embodiment according to the disclosure will be described below with reference to the drawings. In the following description, the same components are denoted by the same reference signs. The names and functions of the components are also the same. Accordingly, detailed descriptions are not repeated.

Figure 1:
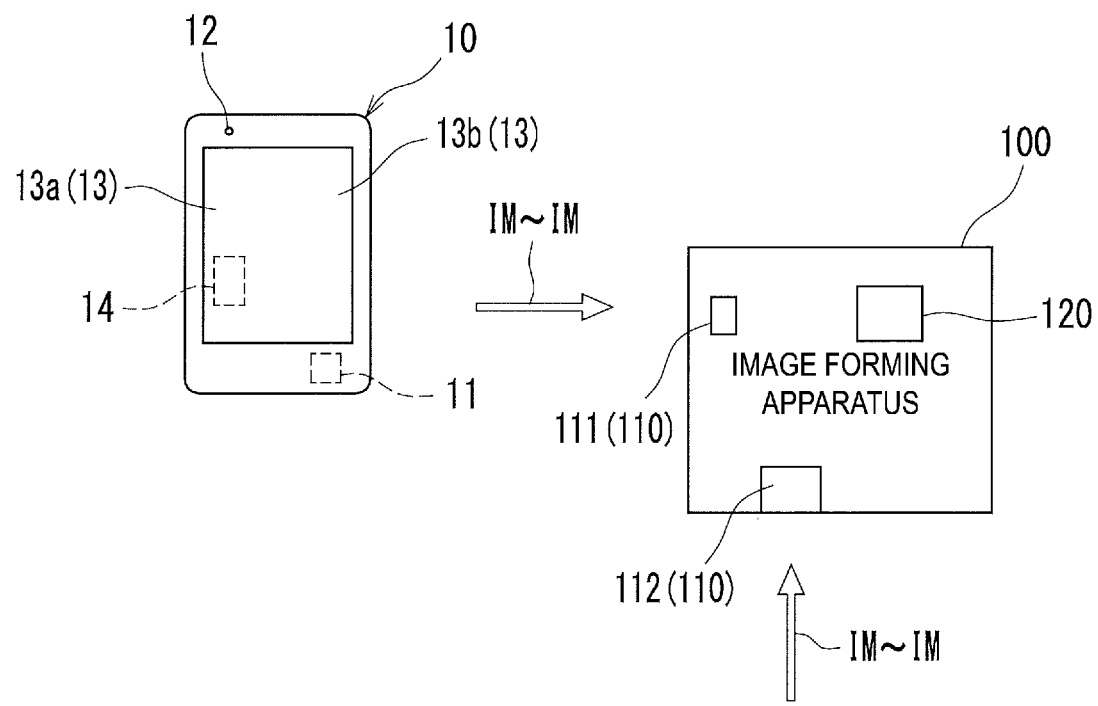
FIG. 1 is a system configuration diagram illustrating an aspect of a print service using an image forming apparatus according to a present embodiment.

FIG. 1 is a system configuration diagram illustrating an aspect of a print service using an image forming apparatus 100 according to the present embodiment.

The image forming apparatus 100 illustrated in FIG. 1 is, for example, a multifunction peripheral installed in a place such as a convenience store. The image forming apparatus 100 can communicate with a mobile terminal device 10. Examples of the mobile terminal device 10 include a multifunctional communication mobile terminal device such as a smartphone and an information processing device, such as a tablet terminal device, that has a camera function and a display screen.

The image forming apparatus 100 includes a data inputter 110 that inputs a plurality of image data IM to IM and a display operation inputter 120 (display operation panel) that receives a selection operation from a user.

The data inputter 110 inputs the image data IM to IM transmitted from the mobile terminal device 10 via a short-range wireless communication, or inputs the image data IM to IM recorded on an external recording medium M, such as a USB flash drive M1 or a SD memory card M2, by attaching the external recording medium M.

The data inputter 110 and the mobile terminal device 10 include short-range wireless communicators 111 and 11, respectively, and can perform short-range wireless communication with each other. Examples of the short-range wireless communication generally include wireless LAN communication. Examples of the wireless LAN communication include wireless LAN communication of the IEEE 802. 11 standard represented by the Wi-Fi standard. In this example, the short-range wireless communicators 111 and 11 are communication interfaces conforming to the IEEE 802.11 standard.

The data inputter 110 includes a memory slot 112 such as a USB flash drive slot or a SD memory card slot.

The mobile terminal device 10 further includes an imager 12 (camera), a user interface 13, and a controller 14. The imager 12 has a camera function. The user interface 13 includes an output device such as a display 13a (display panel) and an input device such as a touching operation inputter 13b (touch panel). The user interface 13 can perform operations such as activation control of a control program including an image processing program and a touching operation on the image data IM to IM. The display 13a displays a captured image captured by the imager 12. The touching operation inputter 13b receives an operation from a user. The controller 14 includes a computer such as a CPU. The controller 14 is configured to implement various functions necessary for the controller 14 by executing an application (app) such as a control program stored (installed) in advance in a storage (not illustrated). The controller 14 performs various kinds of processing by loading an application stored in advance in a ROM of the storage in the mobile terminal device 10 onto a RAM of the storage and executing the app.

Figure 2:
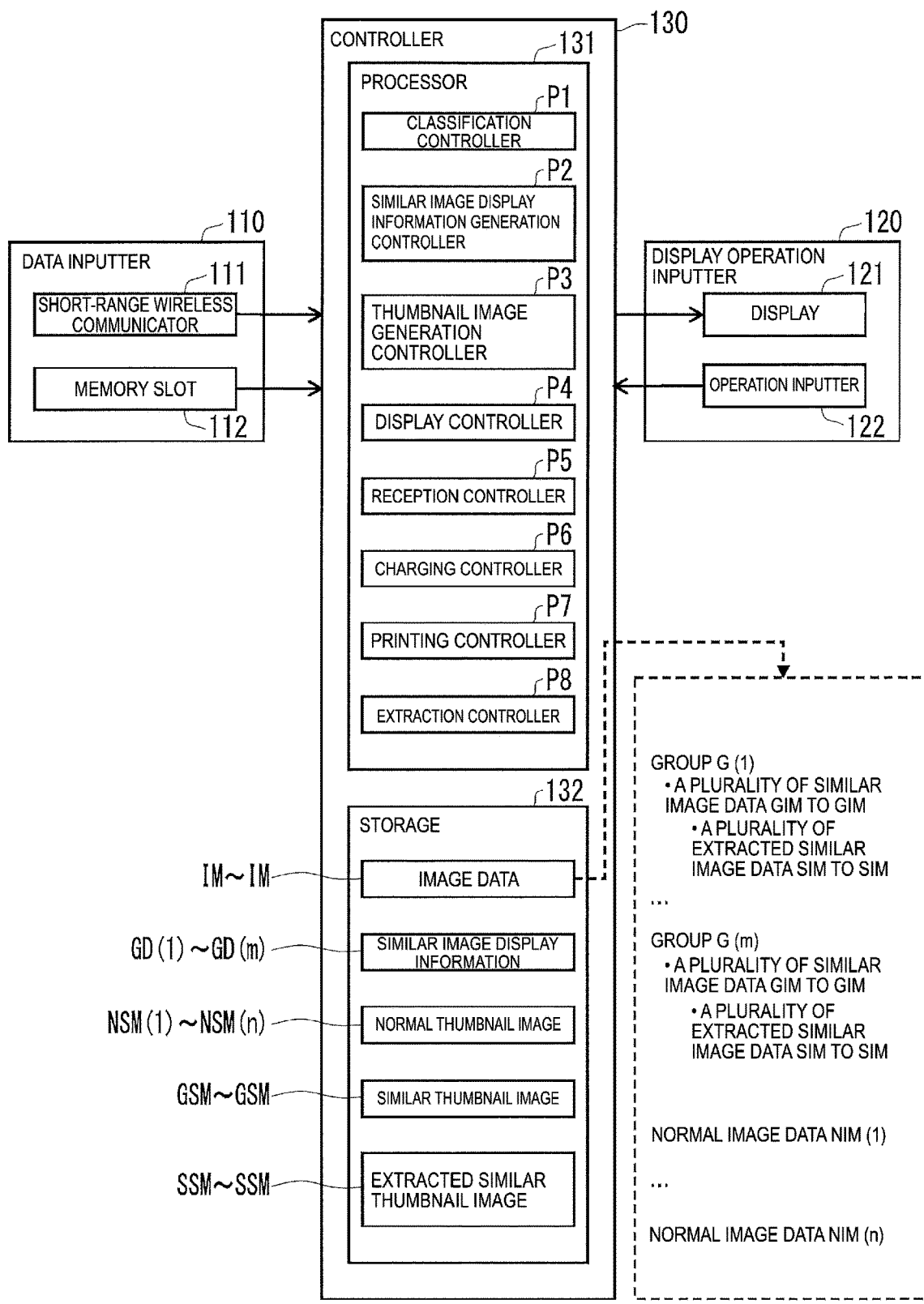
FIG. 2 is a system block diagram illustrating a hardware configuration of the image forming apparatus illustrated in FIG. 1.

FIG. 2 is a system block diagram illustrating a hardware configuration of the image forming apparatus 100 illustrated in FIG. 1.

As shown in FIG. 2, the image forming apparatus 100 further includes a controller 130. The controller 130 controls the entire image forming apparatus 100. The controller 130 includes a processor 131 and a storage 132. The processor 131 includes a microcomputer such as a CPU. The storage 132 includes a nonvolatile memory such as a ROM and a volatile memory such as a RAM. The processor 131 loads a control program stored in advance in the ROM of the storage 132 onto the RAM of the storage 132 and executes the control program, so that the controller 130 performs operation control of various components. In addition, the controller 130 performs transmission and reception of data during communications, various input and output control, and control of arithmetic processing. Note that some or all of the processor 131 included in the controller 130 may include an electronic circuit. The control program including the image processing program may be a program for causing a plurality of processors to function as various processors 131.

The short-range wireless communicator 111 and the memory slot 112 in the data inputter 110 are electrically connected to an input system of the controller 130. Accordingly, the controller 130 can receive the image data IM to IM captured with the camera function of the mobile terminal device 10 from the mobile terminal device 10 via the short-range wireless communicator 111. In addition, the controller 130 can receive a plurality of pieces of image data IM to IM recorded on the external recording medium M from the external recording medium M via the memory slot 112. Further, the controller 130 stores in the storage 132 the plurality of pieces of image data IM to IM received.

The display operation inputter 120 includes a display 121 (display panel) and a touching operation inputter 122 (touching operation panel) provided on the display 121. Upon receiving a touching operation on the touching operation inputter 122 on the display 121 by a user's finger, the controller 130 reads the position of the operation with the touching operation inputter 122, determines that a software switch such as an icon, a button, or a key displayed at the operation position on the display 121 has been pressed, and performs processing.

First Embodiment

The image forming apparatus 100 prints one piece of image data IM or a plurality of pieces of image data IM to IM selected from the plurality of pieces of image data IM to IM input from the data inputter 110.

The controller 130 (computer) includes a classification controller P1, a similar image display information generation controller P2, a thumbnail image generation controller P3, and a display controller P4. The image processing program causes the controller 130 of the image forming apparatus 100 to execute respective steps including a classification control step, a similar image display information generation control step, a thumbnail image generation control step, and a display control step. That is, the controller 130 functions as a control configuration including a classification controller P1 corresponding to the classification control step, a similar image display information generation controller P2 corresponding to the similar image display information generation control step, a thumbnail image generation controller P3 corresponding to the thumbnail image generation control step, and a display controller P4 corresponding to the display control step. The image forming apparatus 100 may cause the controller 130 to operate by using an image processing program recorded in a recording medium, or may cause the controller 130 to operate by using an image processing program downloaded from a server via the Internet.

The classification controller P1 classifies, among the plurality of pieces of image data IM to IM that are input, one or more pluralities of pieces of image data IM to IM into one or more groups G (1) to G (m) (m is an integer of 1 or more), each including a plurality of pieces of similar image data GIM to GIM, the one or more pluralities of pieces of image data IM to IM each satisfying a corresponding predetermined classification condition for grouping similar images, and classifies one or more pieces of image data IM to IM not satisfying the classification condition as one or more pieces of normal image data NIM (1) to NIM (n) (n is an integer of 1 or more).

The similar image display information generation controller P2 generates one or more pieces of similar image display information GD (1) to GD (m) corresponding to the one or more groups G (1) to G (m) obtained by classification by the classification controller P1 for each of the one or more groups G (1) to G (m).

The thumbnail image generation controller P3 generates one or more normal thumbnail images NSM (1) to NSM (n) respectively corresponding to the one or more pieces of normal image data NIM (1) to NIM (n) obtained by classification by the classification controller P1. The one or more pieces of image data IM to IM, the one or more pieces of similar image display information GD (1) to GD (m), and the one or more normal thumbnail images NSM (1) to NSM (n) are stored in the storage 132.

The display controller P4 displays the one or more pieces of similar image display information GD (1) to GD (m) generated by the similar image display information generation controller P2 and the one or more normal thumbnail images NSM (1) to NSM (n) generated by the thumbnail image generation controller P3 in a manner that allows selection operation.

The controller 130 further includes a reception controller P5, a charging controller P6, and a printing controller P7.

The reception controller P5 receives a selection operation on the one or more pieces of similar image display information GD (1) to GD (m) and the one or more pieces of normal thumbnail images NSM (1) to NSM (n) displayed by the display controller P4.

A charging controller P6 charges the printing fee for one piece of image data IM or pieces of image data IM to IM corresponding to the one or more thumbnail images for which the selection operation has been received by the reception controller P5.

The printing controller P7 prints the one piece of image data IM or the pieces of image data IM to IM charged by the charging controller P6 on a recording sheet (for example, paper for photo printing).

FIGS. 3A to 3D are flowcharts respectively illustrating a flow of the first processing to the fourth processing of an example of the image processing program. FIG. 4 and FIG. 6 to FIG. 12 are plan views respectively illustrating the first display screen G1 and the second display screen G2 to the eighth display screen G8 of the display 121 in the image forming apparatus 100, respectively. FIG. 5 is a plan view illustrating an image list screen of the display 13a in the mobile terminal device 10. In the following processing example, a shuffle print service for allocating a plurality of images to a predetermined template will be described as an example of the print service.

Figure 3A:
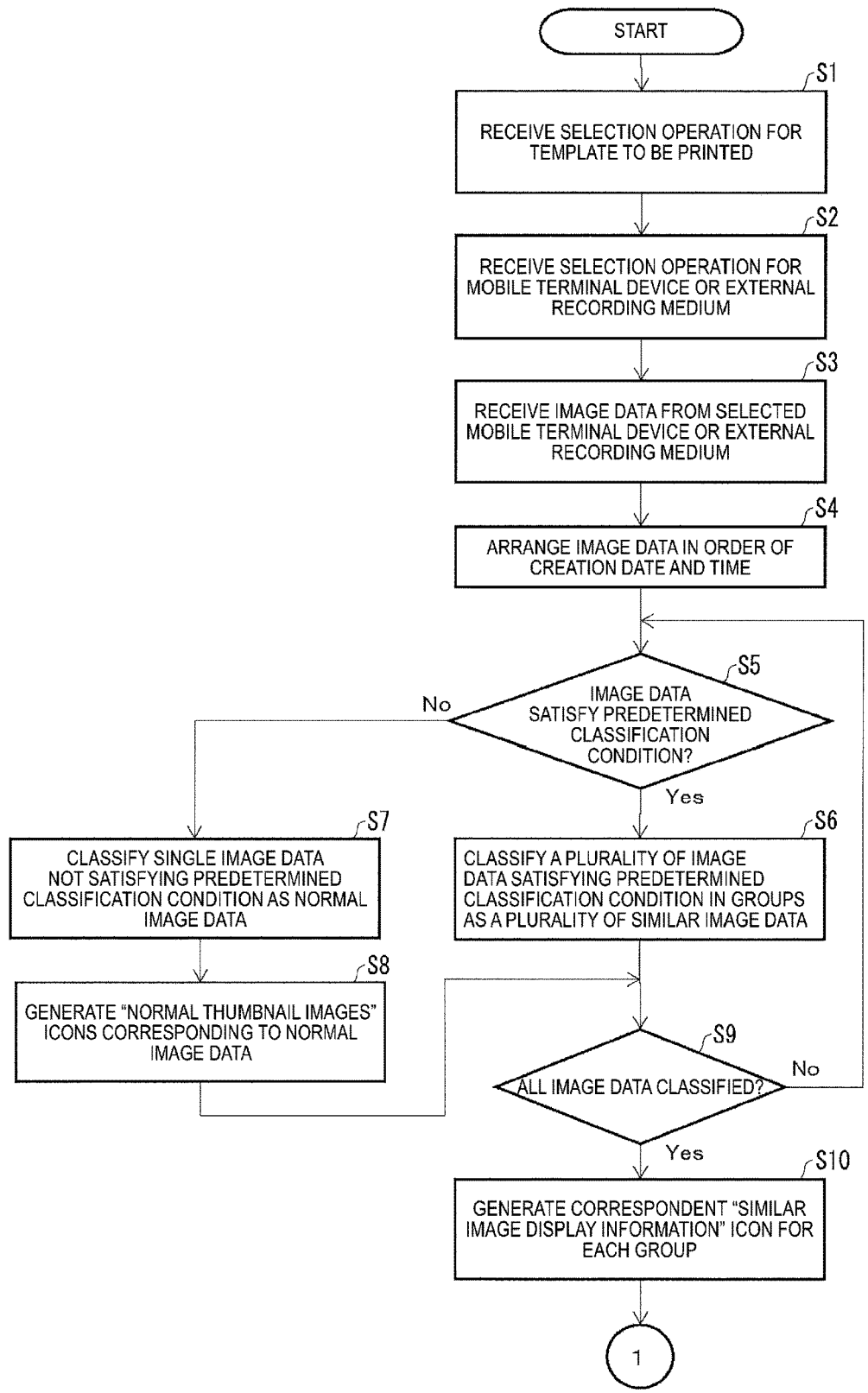
FIG. 3A is a flowchart illustrating a flow of a first process of an example image processing program.
Figure 4:
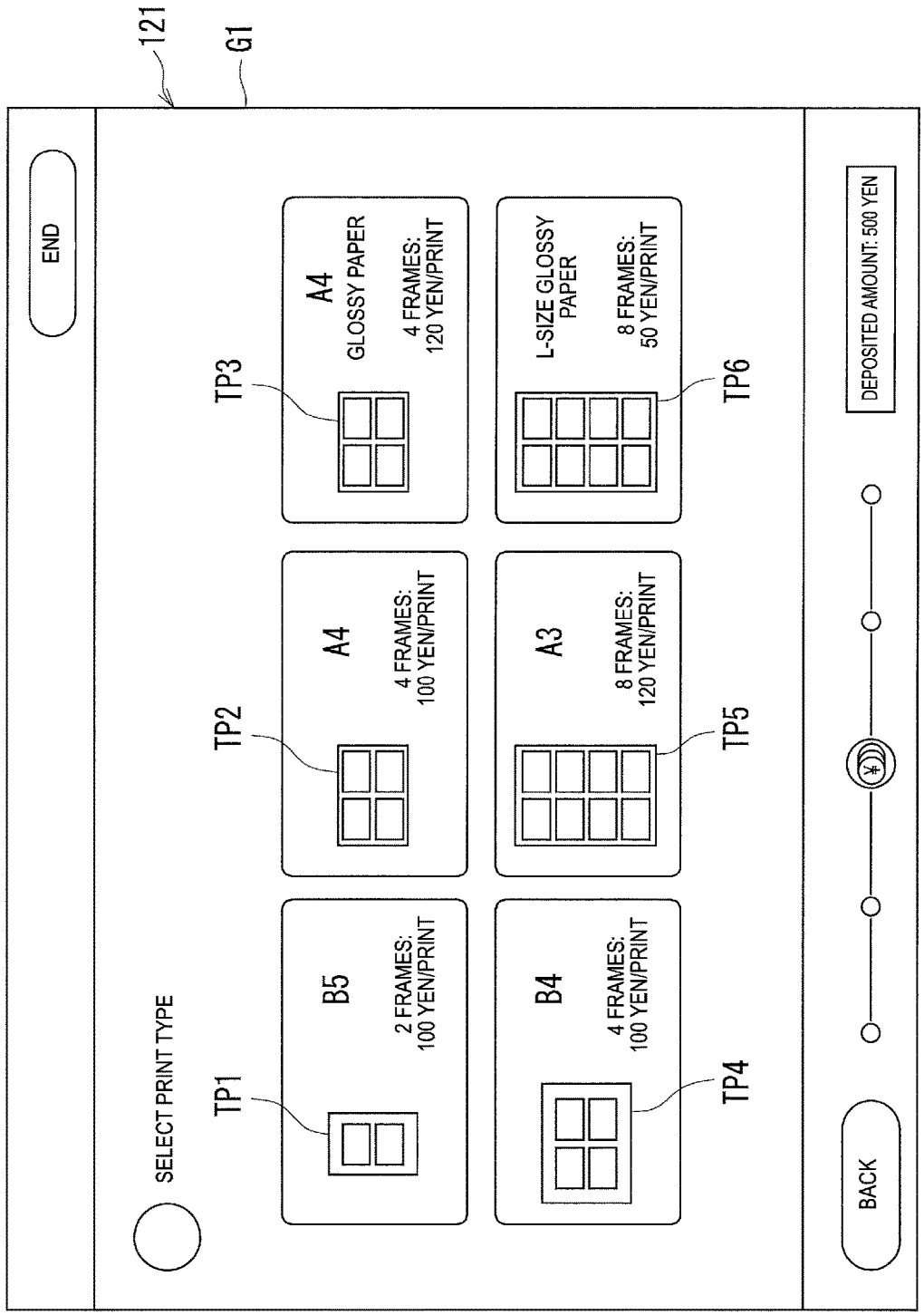
FIG. 4 is a plan view illustrating a first display screen of a display in the image forming apparatus.
Figure 5:
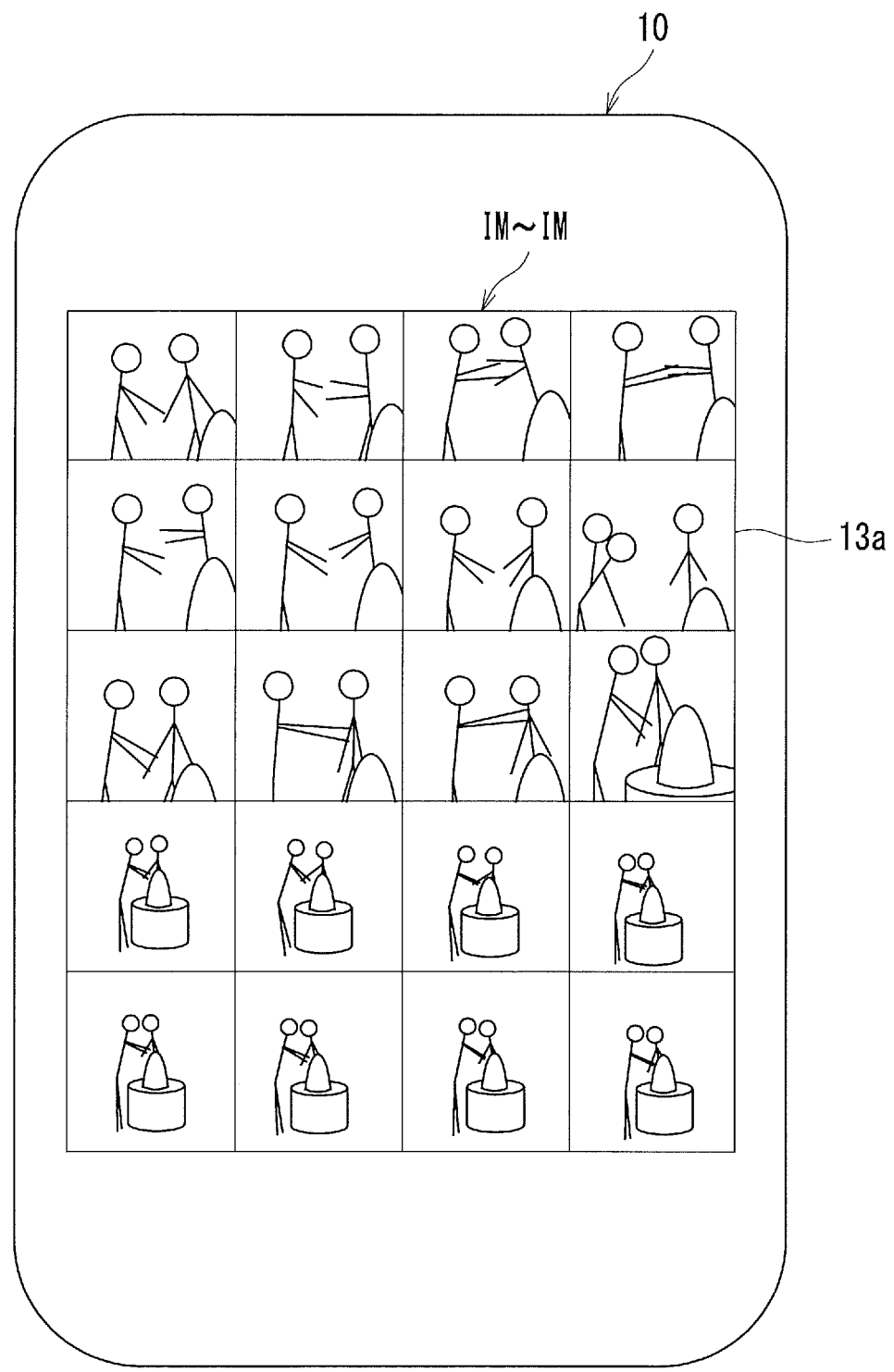
FIG. 5 is a plan view illustrating an image list screen of a display in a mobile terminal device.

As illustrated in FIG. 3A, first, upon receiving a selection operation (touching operation) from a user on a "template (TP6 in this example)" icon to be printed among a plurality of types of "templates TP1 to TP6" icons on the first display screen G1 of the display 121 illustrated in FIG. 4 (S1), the controller 130 receives, on an image data input device selection screen, not illustrated, of the display 121, a selection operation (touching operation) from the user of the mobile terminal device or the external recording medium M with a plurality of image data IM to IM recorded thereon (S2).

Next, the controller 130 receives the plurality of pieces of image data IM to IM from the mobile terminal device 10 or the external recording medium M (the mobile terminal device 10 in the example illustrated in FIG. 5) selected by the user (S3), and arranges the plurality of pieces of image data IM to IM in order of creation date and time (imaging date and time) (S4). Next, the controller 130 determines whether or not each of the plurality of pieces of image data satisfies a predetermined classification condition (S5), and if the predetermined classification condition is satisfied (S5: Yes), classifies pluralities of pieces of image data IM to IM into groups G (i) of a plurality of pieces of similar image data GIM to GIM (i is an integer from 1 to m, m=2 in this example), the pluralities of pieces of image data IM to IM each satisfying a corresponding predetermined classification condition (S6). On the other hand, if the predetermined classification condition is not satisfied (S5: No), the controller 130 classifies a single piece of image data IM not satisfying the predetermined classification condition as a piece of normal image data NIM (j) (j is an integer from 1 to n, n=6 in this example) (S7), and generates a "normal thumbnail image NSM (j)" icon corresponding to the piece of normal image data NIM (j) (S8).

Next, the controller 130 determines whether or not all of the plurality of pieces of image data IM to IM have been classified (S9), and if one piece of image data IM or pieces of image data IM to IM are present that have not been classified yet (S9: No), proceeds to S5, whereas if the classification has been completed (S9: Yes), generates one or more "similar image display information GD (1) to GD (m)" icons respectively corresponding to the one or more groups G (1) to G (m) for the one or more groups G (1) to G (m) (S10), and proceeds to the processing illustrated in FIG. 3B.

Figure 3B:
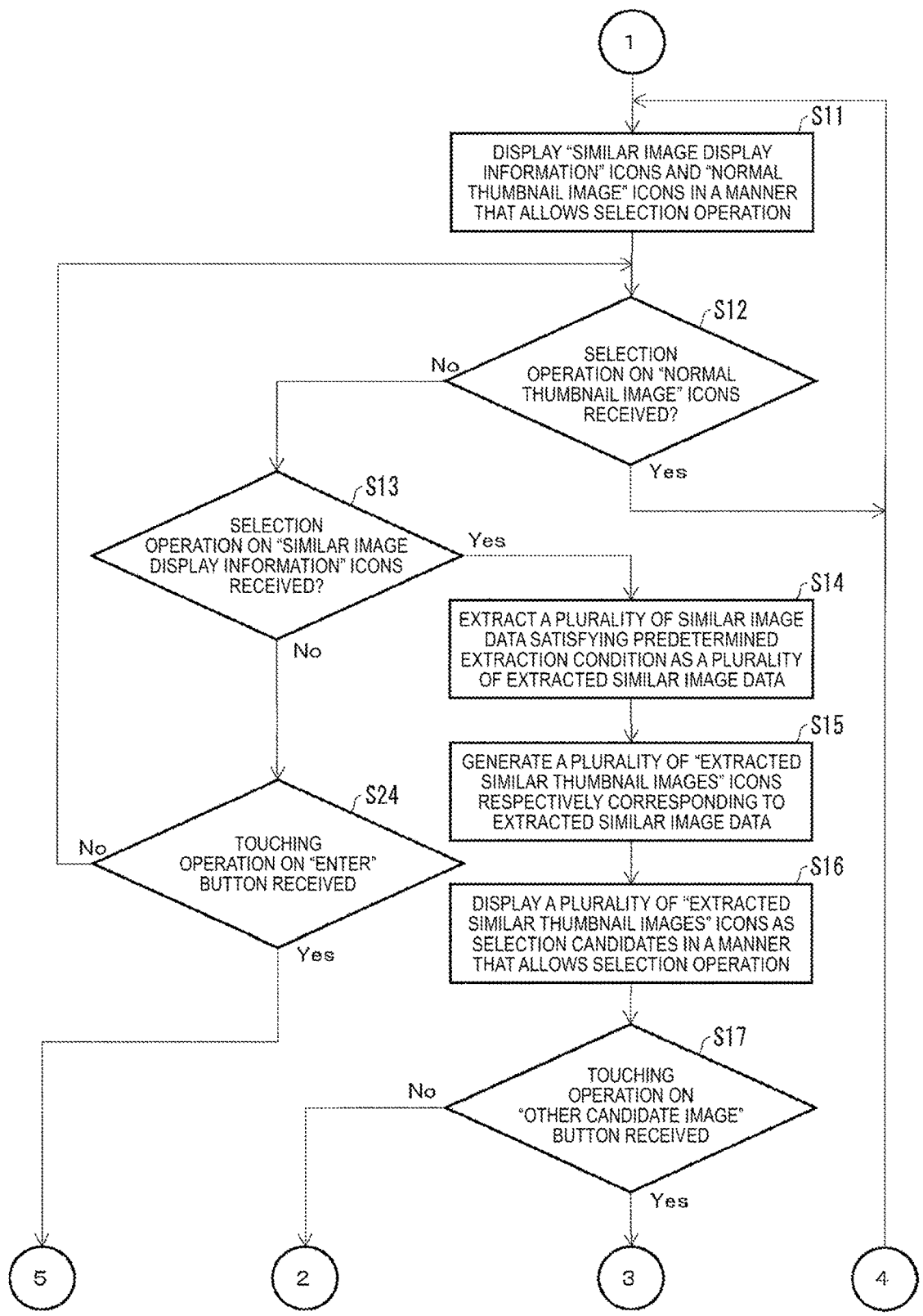
FIG. 3B is a flowchart illustrating a flow of a second process of the example image processing program.
Figure 6:
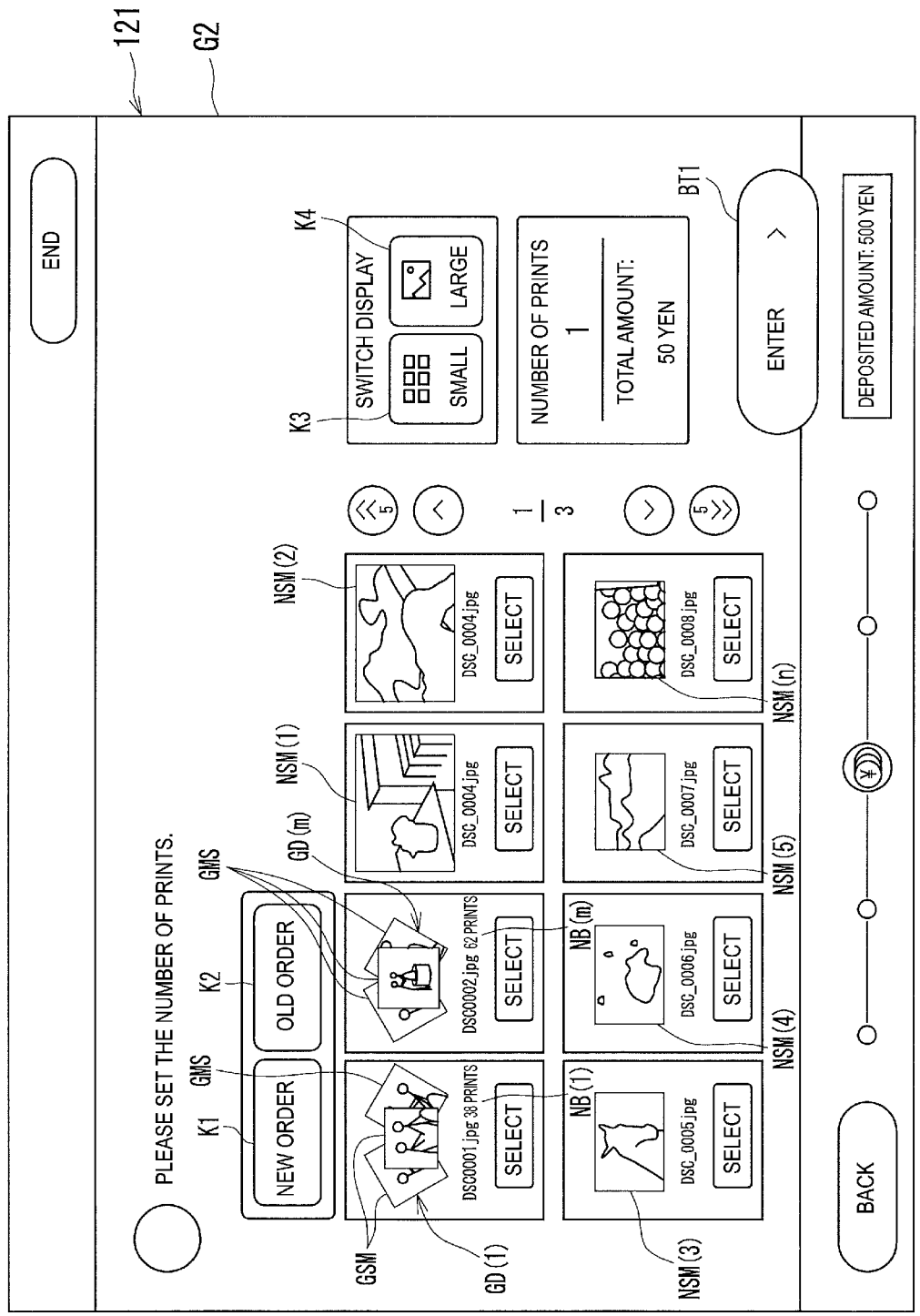
FIG. 6 is a plan view illustrating a second display screen of the display in the image forming apparatus.

As illustrated in FIG. 3B, the controller 130 displays the "similar image display information GD (1) to GD (m)" icons and the "normal thumbnail images NSM (1) to NSM (n)" icons on the second display screen G2 illustrated in FIG. 6 of the display 121 in a manner that allows selection operation (touching operation) (S11). Upon receiving a touching operation on a "new order" key K1 or an "old order" key K2, the controller 130 rearranges the "similar image display information GD (1) to GD (m)" icons and the "normal thumbnail images NSM (1) to NSM (n)" icons in reverse chronological order or chronological order of the creation date and time. In addition, upon receiving a touching operation on a "small" key K3 or a "large" key K4, the controller 130 changes the "similar image display information GD (1) to GD (m)" icons and the "normal thumbnail images NSM (1) to NSM (n)" icons to small sized icons or large sized icons.

According to the present embodiment, even when there are a large number of pieces of similar image data IM to IM in an identical situation due to a burst capture function (a function of capturing a series of images in quick succession) of the camera of the mobile terminal device 10, one or more pluralities of pieces of image data IM to IM, each satisfying a corresponding predetermined classification condition among the plurality of image data IM to IM are classified into one or more groups G (1) to G (m), each including a plurality of similar image data GIM to GIM, one or more pieces of image data IM to IM not satisfying the classification condition are classified as one or more pieces of normal image data NIM (1) to NIM (n), the one or more pieces of similar image display information GD (1) to GD (m) respectively corresponding to the one or more groups G (1) to G (m) obtained by classification and the one or more normal thumbnail images NSM (1) to NSM (n) respectively corresponding to the one or more pieces of normal image data NIM (1) to NIM (n) are generated, and the one or more pieces of similar image display information GD (1) to GD (m) and the one or more normal thumbnail images NSM (1) to NSM (n) that are generated are displayed in a manner that allows selection operation. Therefore, the user can select ones wanted by the user from the one or more pieces of similar image display information GD (1) to GD (m) obtained by collectively grouping a large number of pieces of similar image data (similar image data GIM to GIM) in an identical situation and the normal thumbnail images NSM (1) to NSM (n) of dissimilar image data (normal image data NIM (1) to GIM (n)), thereby simplifying the selection operation. In addition, since the user is allowed to select images, the selected images are the ones wanted by the user. Further, since the controller 130 performs a processing of determining whether or not pieces of image data IM to IM satisfy the classification condition, it is possible to shorten the processing time of the pieces of image data IM to IM, reducing wait time of the user accordingly.

Therefore, it is possible to allow the user to efficiently, in a short period of time, select one piece of image data IM or pieces of image data IM to IM wanted by the user from a large number of pieces of similar image data IM to IM in an identical situation.

Second Embodiment

Similar images in an identical situation are usually captured in a short period of time (for example, with the burst capture function of the camera of the mobile terminal device 10).

In this regard, in the present embodiment, the classification condition is a condition as to whether or not a time interval of creation date and time between the pieces of image data IM to IM is shorter than a predetermined reference time interval.

In this way, the pieces of image data IM to IM captured in a short period of time (for example, with the burst capture function of the camera of the mobile terminal device 10) can be considered to be image data of similar images in an identical situation (pieces of similar image data GIM to GIM) and classified into the one or more groups G (1) to G (m). In addition, since the controller 130 compares the time interval of the creation date and time between the pieces of image data IM to IM, it is possible to further shorten the processing time of the pieces of image data IM to IM, reducing the wait time of the user accordingly.

In the present embodiment, the classification condition may be a condition as to whether or not one piece of the image data IM and another piece of the image data IM are similar to each other.

In this way, it is possible to compare the one piece of the image data IM with the other piece of the image data IM, thereby improving the image detection accuracy. Whether or not the one piece of the image data IM and the other piece of the image data IM are similar to each other can be determined by known image processing, and a detailed description thereof will be omitted here.

Third Embodiment

With regard to a plurality of pieces of similar image data GIM to GIM existing in each of the one or more groups G (1) to G (m) of the one or more pieces of similar image display information GD (1) to GD (m), it is not possible to allow the user to recognize how many pieces of similar image data GIM to GIM exists in each of the one or more groups G (1) to G (m).

In this regard, in the present embodiment, the one or more pieces of similar image display information GD (1) to GD (m) respectively include the one or more numbers NB (1) to NB (m) (see FIG. 6) of the plurality of pieces of similar image data GIM to GIM in the one or more groups G (1) to G (m).

In this way, it is possible to allow the user to recognize how many pieces of similar image data GIM to GIM exists in each of the one or more groups G (1) to G (m) from the one or more displayed numbers NB (1) to NB (m).

Fourth Embodiment

With regard to displaying the one or more pieces of similar image display information GD (1) to GD (m), it is not possible to allow the user to recognize what kind of images exist in each of the one or more groups G (1) to G (m) of the one or more pieces of similar image display information GD (1) to GD (m) by merely displaying the one or more pieces of similar image display information GD (1) to GD (m).

In this regard, in the present embodiment, the thumbnail image generation controller P3 generates a plurality of similar thumbnail images GSM to GSM ("similar thumbnail images GSM to GSM" icons) which respectively correspond to the plurality of pieces of similar image data GIM to GIM in each of the one or more groups G (1) to G (m). The plurality of similar thumbnail images GSM to GSM are stored in the storage 132.

The one or more pieces of similar image display information GD (1) to GD (m) includes at least a part (all or a part, three in this example) of the plurality of similar thumbnail images GSM to GSM generated by the thumbnail image generation controller P3 (see FIG. 6).

In this way, it is possible to allow the user to visually recognize at least a part of the plurality of similar thumbnail images GSM to GSM in the one or more groups G (1) to G (m), whereby the user can generally recognize what kind of images exist in the one or more groups G (1) to G (m).

Fifth Embodiment

In the present embodiment, the display controller P4 receives a selection operation (touching operation) for the one or more pieces of similar image display information GD (1) to GD (m) and the one or more normal thumbnail images NSM (1) to NSM (n) that are displayed, and if the received selection operation is for the one or more pieces of similar image display information GD (1) to GD (m), displays selection candidates for the plurality of pieces of similar image data GIM to GIM in each of the one or more groups G (1) to G (m) corresponding to the one or more pieces of similar image display information GD (1) to GD (m) in a manner that allows selection operation. The detail of the above will be described later with reference to FIG. 3B, FIG. 3C and FIG. 6 to FIG. 9.

In this way, it is possible to allow the user to visually recognize the images of the plurality of pieces of similar image data GIM to GIM in each of the one or more groups G (1) to G (m) of the one or more pieces of similar image display information GD (1) to GD (m), whereby the user can clearly recognize what kind of images exists in each of the one or more groups G (1) to G (m).

The images of the plurality of pieces of similar image data GIM to GIM in each of the one or more groups G (1) to G (m) corresponding to the one or more pieces of similar image display information GD (1) to GD (m) are usually a large number of similar images in an identical situation. In this case, even though similar image data of an image having extremely poor luminance and/or contrast ratio may exist in the large number of images, the similar image data of the image having the extremely poor luminance and/or contrast ratio may become a selection candidate.

In this regard, in the present embodiment, the controller 130 further includes an extraction controller P8. The extraction controller P8 extracts, from among the plurality of pieces of similar image data GIM to GIM in each of the one or more groups G (1) to G (m) corresponding to the one or more pieces of similar image display information GD (1) to GD (m), a plurality of pieces of similar image data GIM to GIM satisfying a predetermined extraction condition related to luminance and/or contrast ratio as a plurality of pieces of extracted similar image data SIM to SIM. Examples of the contrast ratio include a value of an equation Lmax/Lmin, where Lmax is a luminance when the display 121 displays white, and Lmin is a luminance when the display 121 displays black. In addition, when the luminance values and/or the contrast ratios of the plurality of pieces of similar image data GIM to GIM can be considered to be a normal distribution, the extraction condition can be, for example, within a range of ±3σ with the standard deviation being σ.

The similar image display information generation controller P2 generates a plurality of extracted similar thumbnail images SSM to SSM respectively corresponding to the plurality of pieces of extracted similar image data SIM to SIM extracted by the extraction controller P8. The extracted similar thumbnail images SSM to SSM are stored in the storage 132. The display controller P4 displays the plurality of extracted similar thumbnail images SSM to SSM generated by the similar image display information generation controller P2 as selection candidates in a manner that allows selection operation.

In this way, the similar image data of the image having the extremely poor luminance and/or contrast ratio can be excluded from the selection candidates, thus preventing the similar image data of the image having the extremely poor luminance and/or contrast ratio from becoming the selection candidate.

Even if a plurality of pieces of extracted similar image data SIM to SIM has been extracted, there may be cases where the number of the plurality of pieces of extracted similar image data SIM to SIM is too large for the user to select.

In this regard, in the present embodiment, the extraction controller P8 may further extract some pieces of extracted similar image data SIM, SIM, SIM (see FIG. 7) from among the plurality of pieces of extracted similar image data SIM to SIM.

As a result, the number of the plurality of pieces of extracted similar image data SIM to SIM can be reduced to an appropriate number (for example, the number ranging from 2 to 5, or about 3) that can be easily selected by the user.

These will be described by taking the processing of S12 to S18 illustrated in FIG. 3B as an example. As illustrated in FIG. 3B, the controller 130 determines whether or not a touching operation on the "normal thumbnail images NSM (1) to NSM (n)" icons on the second display screen G2 illustrated in FIG. 6 has been received (S12). If the touching operation has been received (S12: Yes), the processing proceeds to S11. On the other hand, if the touching operation has not been received (S12: No), the controller 130 determines whether or not a touching operation on the "similar image display information GD (1) to GD (m)" icons illustrated in FIG. 6 has been received (S13). In the case that the touching operation has not been received (S13: No), if a touching operation on an "enter" button BT1 illustrated in FIG. 6 has not been received (S24: No), the controller proceeds to S12. On the other hand, if the touching operation has been received (S13: Yes), the controller 130 extracts a plurality of pieces of similar image data GIM, GIM, GIM satisfying a predetermined extraction condition (luminance and/or contrast ratio in this example) as a plurality of pieces of extracted similar image data SIM, SIM, SIM (S14).

Figure 7:
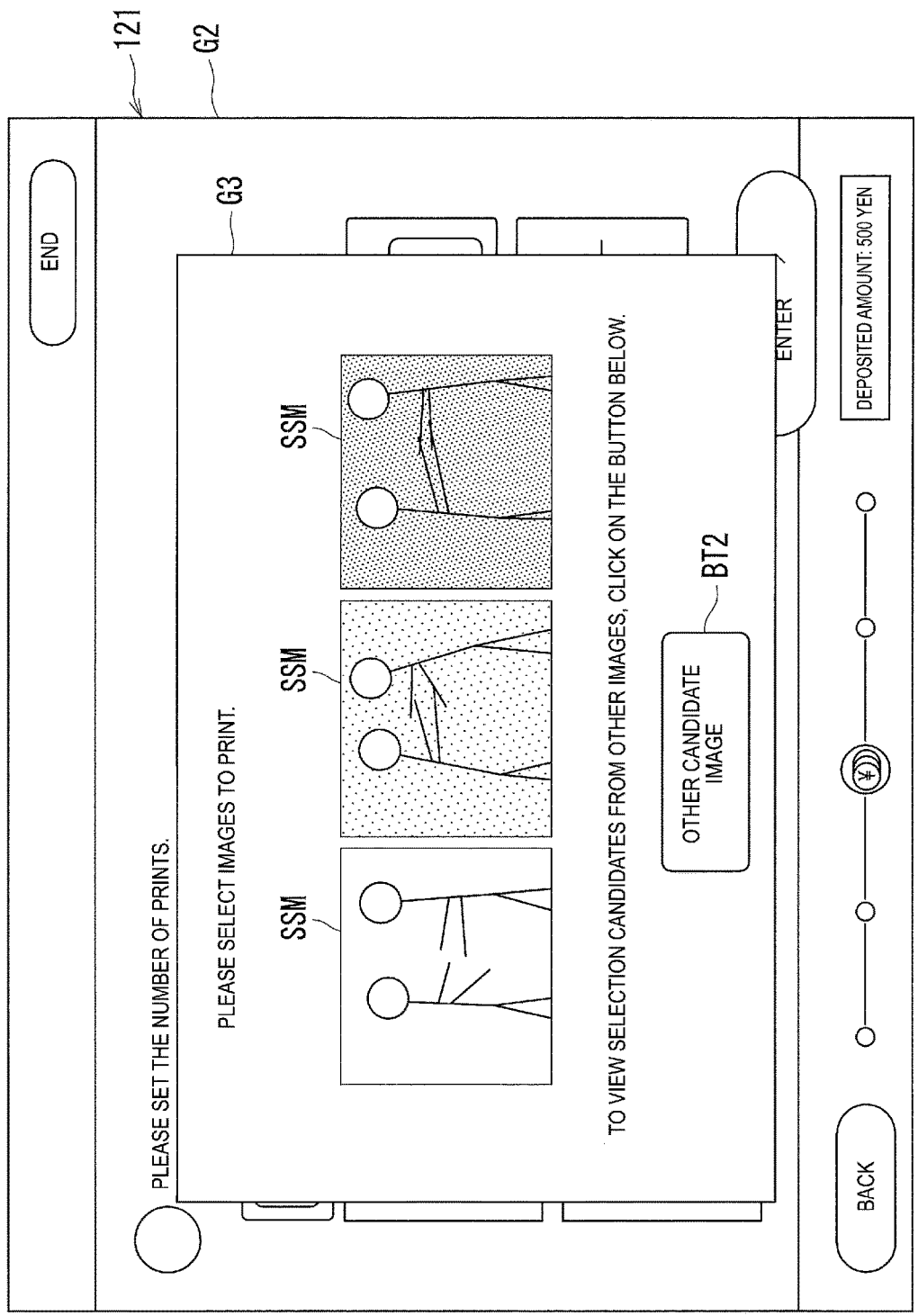
FIG. 7 is a plan view illustrating a third display screen of the display in the image forming apparatus.
Figure 8:
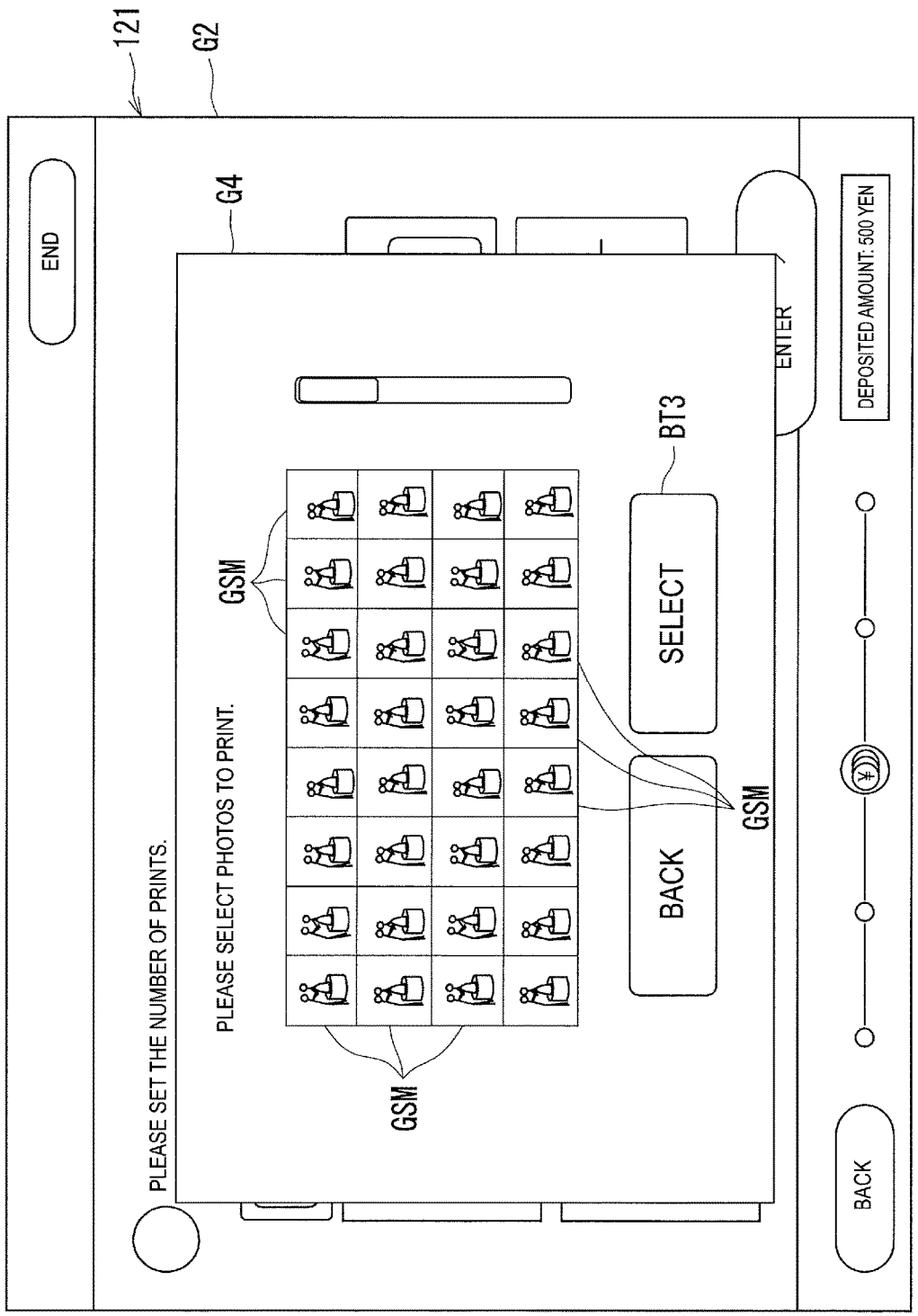
FIG. 8 is a plan view illustrating a fourth display screen of the display in the image forming apparatus.

Next, the controller 130 generates a plurality of "extracted similar thumbnail images SSM, SSM, SSM" icons respectively corresponding to the plurality of pieces of extracted similar image data SIM, SIM, SIM (S15), and displays the plurality of "extracted similar thumbnail images SSM, SSM, SSM" icons as selection candidates on the third display screen G3 (pop-up display screen) shown in FIG. 7 of the display 121 in a manner that allows selection operation (touching operation) (S16).

Figure 3C:
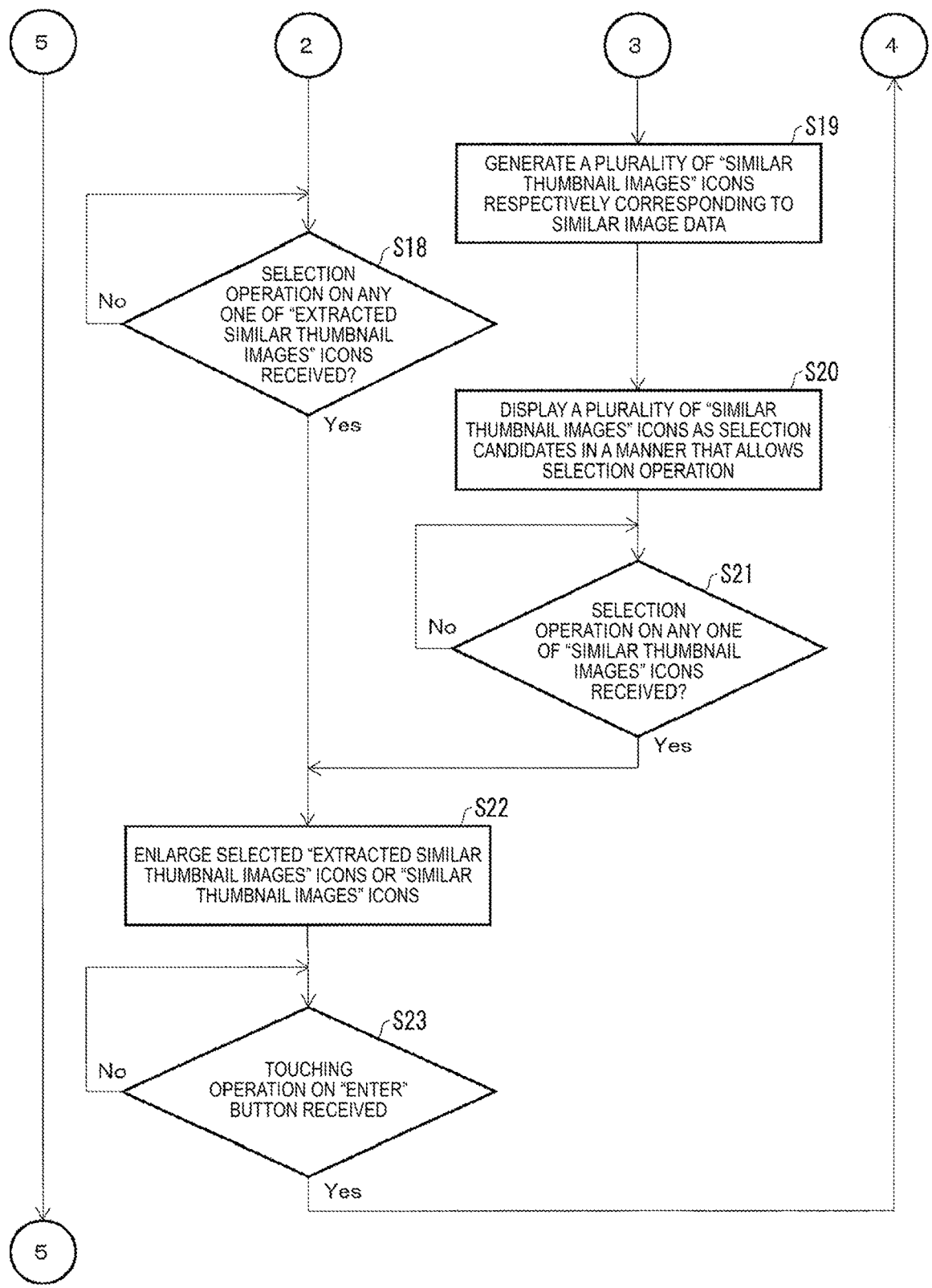
FIG. 3C is a flowchart illustrating a flow of a third process of the example image processing program.

Next, upon receiving a selection operation (touching operation) on any one of the "extracted similar thumbnail images SSM" icons (S18: Yes as illustrated in FIG. 3C) without receiving a touching operation on an "other candidate images" button BT2 illustrated in FIG. 7 (S17: No), the controller 130 proceeds to S22.

In this example, the display controller P4 displays, among the plurality of pieces of extracted similar image data SIM to SIM extracted by the extraction controller P8, three extracted similar thumbnail images SSM, SSM, SSM corresponding to the plurality of pieces of extracted similar image data SIM, SIM, SIM respectively having the maximum, median, and minimum luminance values in a manner that allows selection operation. Alternatively, the display controller P4 may display, among the plurality of pieces of extracted similar image data SIM to SIM extracted by the extraction controller P8, three extracted similar thumbnail images SSM, SSM, SSM corresponding to the plurality of pieces of extracted similar image data SIM, SIM, SIM respectively having the maximum, median, and minimum contrast ratio values in a manner that allows selection operation. Alternatively, the display controller P4 may display, among the plurality of pieces of extracted similar image data SIM to SIM extracted by the extraction controller P8, three extracted similar thumbnail images SSM, SSM, SSM corresponding to the plurality of pieces of extracted similar image data SIM, SIM, SIM in which the overlap portions of the distributions of the luminance and the contrast ratio have the maximum, median, and minimum contrast ratio values in a manner that allows selection operation. The display controller P4 may display the extracted similar thumbnail images SSM to SSM corresponding to pieces of random extracted similar image data SIM to SIM selected from the plurality of pieces of extracted similar image data SIM to SIM extracted by the extraction controller P8 in a manner that allows selection operation.

There may be cases where the user wants to select one piece of similar image data GIM or pieces of similar image data GIM to GIM other than the plurality of pieces of extracted similar image data SIM to SIM among the plurality of pieces of similar image data GIM to GIM.

In this regard, in the present embodiment, the similar image display information generation controller P2 generates the plurality of similar thumbnail images GSM to GSM respectively corresponding to the plurality (all) of pieces of similar image data GIM to GIM in each of the one or more groups G (1) to G (m) corresponding to the one or more pieces of similar image display information GD (1) to GD (m). The display controller P4 displays the plurality of similar thumbnail images GSM to GSM generated by the similar image display information generation controller P2 as selection candidates in a manner that allows selection operation.

In this way, the user can also select the one piece of similar image data GIM or the pieces of similar image data GIM to GIM other than the plurality of pieces of extracted similar image data SIM to SIM among the plurality of pieces of similar image data GIM to GIM.

This will be described by taking the processing of S19 to S21 illustrated in FIG. 3C as an example. Upon receiving a touching operation on the "other candidate image" button BT2 illustrated in FIG. 7 (S17: Yes) as illustrated in FIG. 3B, the controller 130 generates a plurality of "similar thumbnail images GSM to GSM" icons respectively corresponding to the plurality of pieces of similar image data GIM, GIM to GIM (S19), and displays a plurality of "similar thumbnail images GSM to GSM" icons as selection candidates on a fourth display screen G4 (pop-up display screen) illustrated in FIG. 8 of the display 121 in a manner that allows selection operation (touching operation) (S20), as illustrated in FIG. 3C.

Next, upon receiving a selection operation (touching operation) on any one of the "similar thumbnail images GSM to GSM" icons and receiving the touching operation on a "select" button BT3 (S21: Yes), the controller 130 proceeds to S22.

Figure 9:
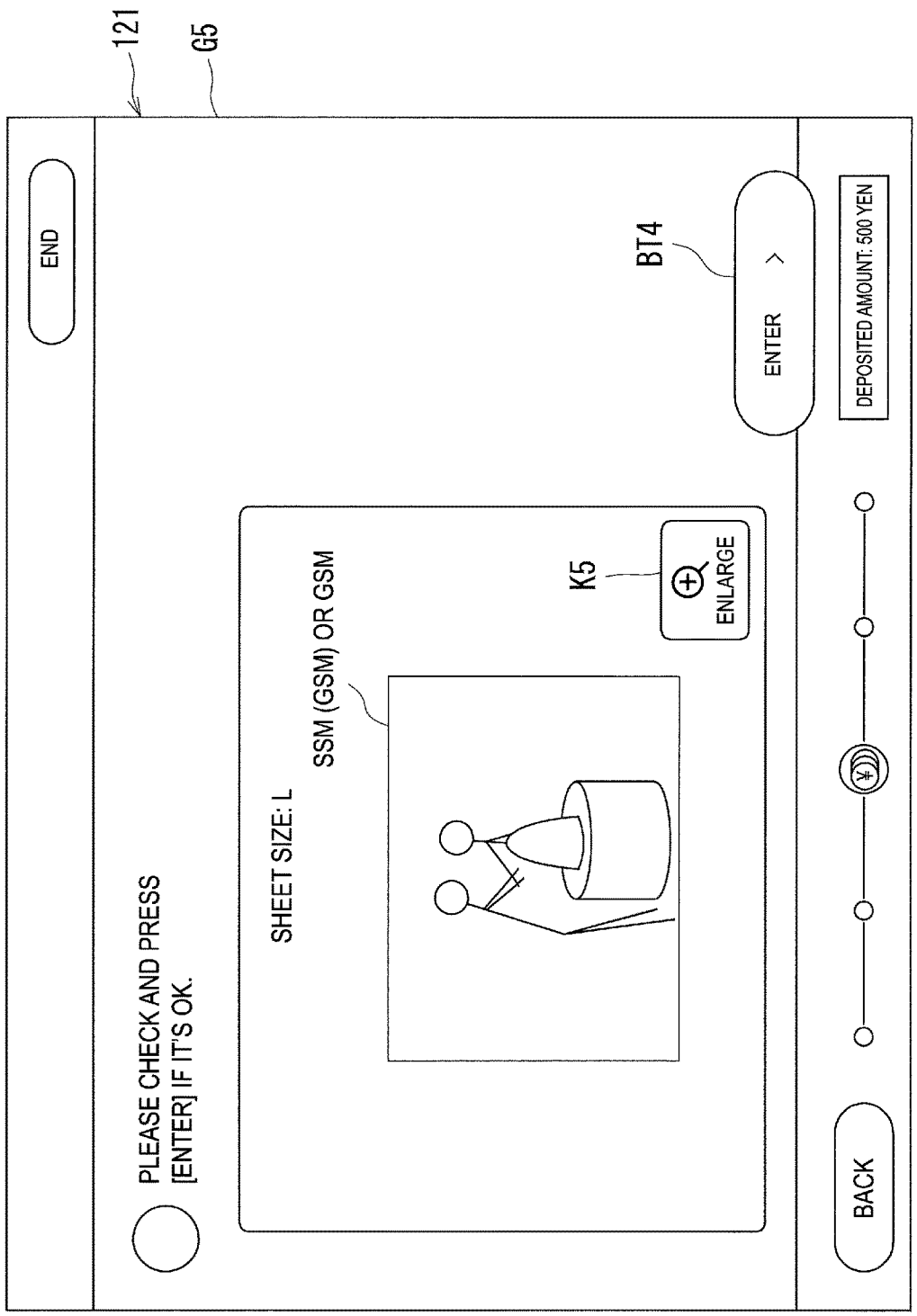
FIG. 9 is a plan view illustrating a fifth display screen of the display in the image forming apparatus.

Next, the controller 130 enlarges the selected "extracted similar thumbnail image SSM (GSM)" icon or "similar thumbnail image GSM" icon on the fifth display screen G5 shown in FIG. 9 (S22), and upon receiving a touching operation on the "enter" button BT4 (S23: Yes), proceeds to S11 shown in FIG. 3B, and repeats the processing from S11 to S23. Upon receiving a touching operation on an "enlarge" key K5 illustrated in FIG. 9, the controller 130 enlarges the "extracted similar thumbnail images SSM (GSM)" icon or the "similar thumbnail images GSM" icon.

In addition, in S24 shown in FIG. 3B, upon receiving a touching operation on the "enter" button BT1 on the second display screen G2 shown in FIG. 6 of the display 121 (S24: Yes), the controller 130 proceeds to S25 shown in FIG. 3D.

Figure 3D:
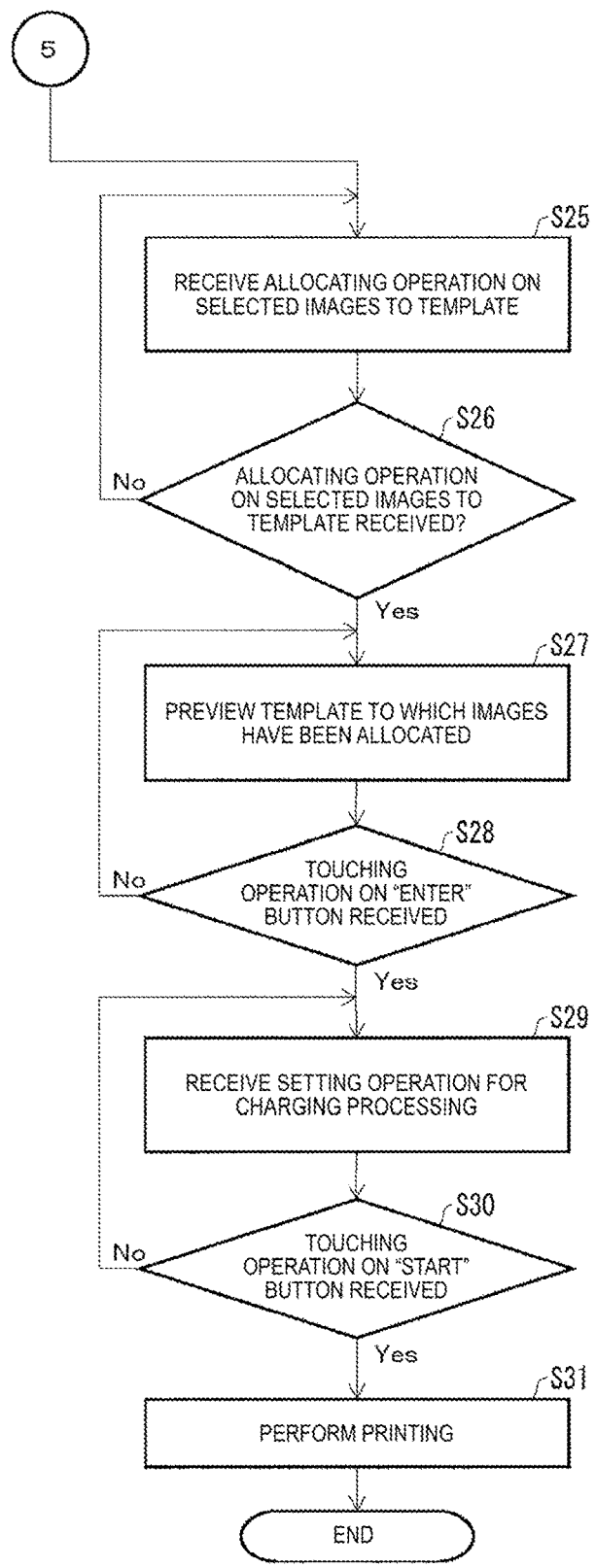
FIG. 3D is a flowchart illustrating a flow of a fourth process of the example image processing program.
Figure 10:
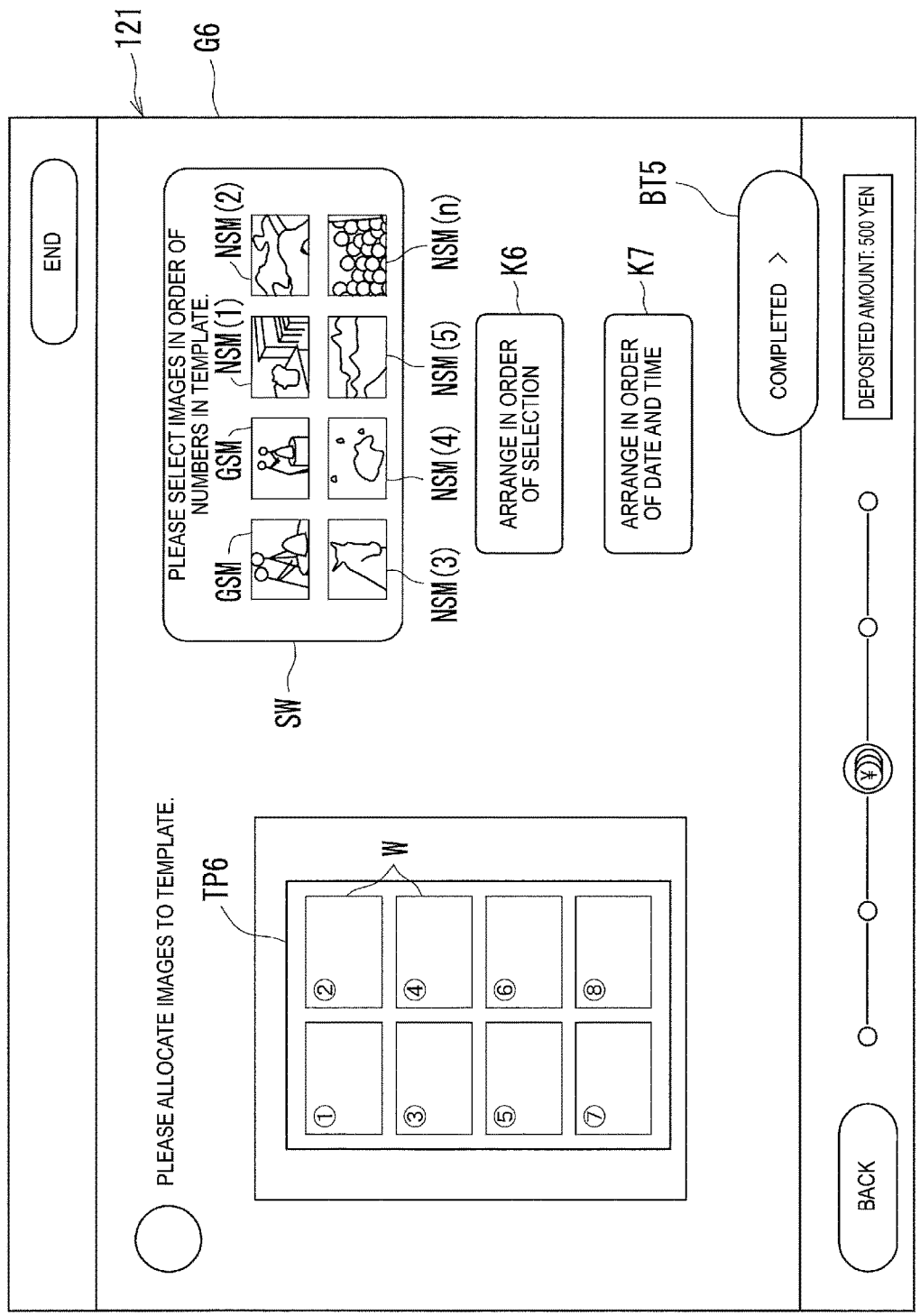
FIG. 10 is a plan view illustrating a sixth display screen of the display in the image forming apparatus.
Figure 11:
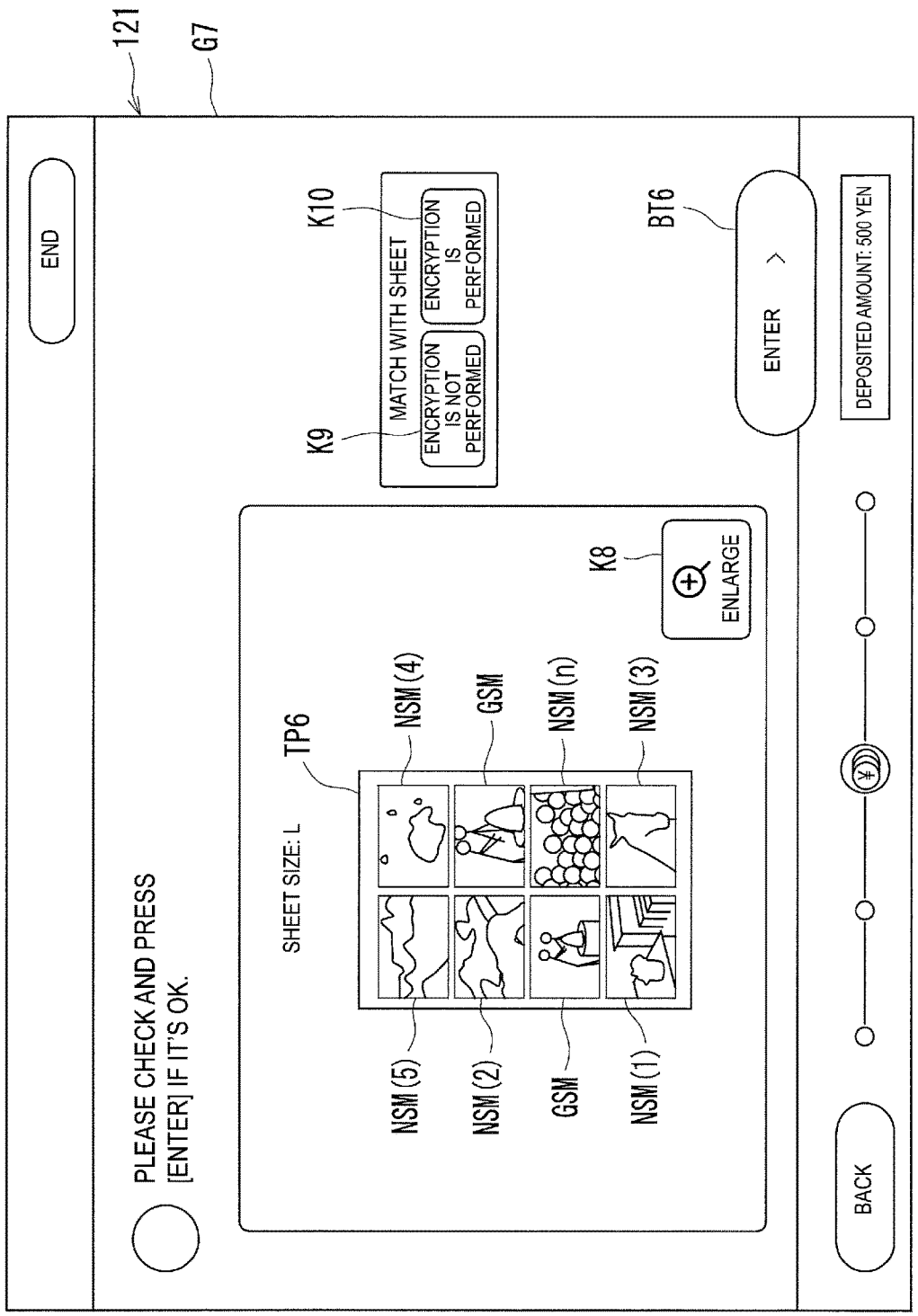
FIG. 11 is a plan view illustrating a seventh display screen of the display in the image forming apparatus.
Figure 12:
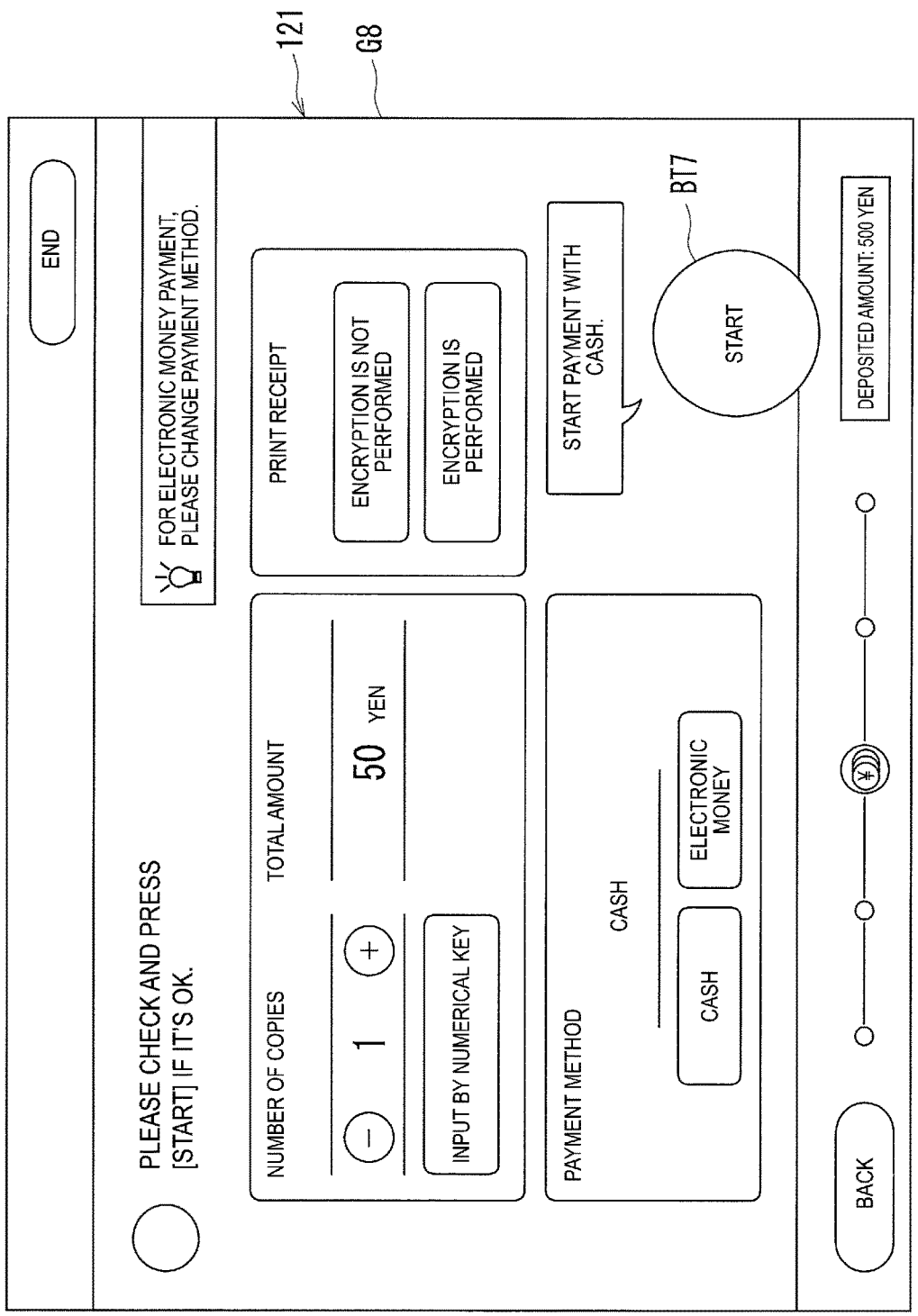
FIG. 12 is a plan view illustrating an eighth display screen of the display in the image forming apparatus.

As illustrated in FIG. 3D, the controller 130 receives, on the sixth display screen G6 of display 121 illustrated in FIG. 10, an allocating operation (touching operation) on selected images [in this example, GSM, GSM, NSM (1), NSM (2), NSM (3), NSM (4), NSM (5), NSM (n)] within a selection frame SW to a template (in this example, TP6) (S25).

Specifically, the controller 130 allocates each of the selected images (in this example, GSM, GSM, NSM (1), NSM (2), NSM (3), NSM (4), NSM (5), and NSM (n)) to a frame W of a number in the template (TP6 in this example) in the order of reception of the selection operation. Upon receiving a touching operation on an "arrange in the order of selection" key K6 or an "arrange in the order of date and time" key K7, the controller 130 automatically allocates the images in the selection frame SW to the template (TP6 in this example) in the order of selection or in the order of creation date and time (shooting date and time).

Next, the controller 130 determines whether or not a completion operation of allocating the selected images to the template (a touching operation on a "completion" button BT5 shown in FIG. 10) has been received (S26). If the operation has not been received (S26: No), the controller 130 proceeds to S25, whereas if the operation has been received (S26: Yes), the template TP6 to which the images have been allocated is previewed [displayed on the seventh display screen G7 (preview display screen) of the display 121 illustrated in FIG. 11] (S27). Upon receiving a touching operation on the "enlarge" key K8, the controller 130 enlarges the template TP6 to which the images have been allocated.

Next, upon receiving a touching operation on the "enter" button BT6 (S28: Yes), the controller 130 receives a setting operation for charging processing on the eighth display screen G8 illustrated in FIG. 12 of the display 121 (S29), and upon receiving a touching operation on a "start" button BT7 illustrated in FIG. 12 (S30: Yes), executes printing (S31).

Sixth Embodiment

In the first to fifth embodiments described above, the image processing program is executed by the image forming apparatus 100, but may be executed by the controller 14 of the mobile terminal device 10.

In this case, the image processing program causes the controller 14 of the mobile terminal device 10 to execute respective steps including a classification control step, a similar image display information generation control step, a thumbnail image generation control step, a display control step, a reception control step, and an extraction control step. That is, the controller 14 functions as a control configuration including a classification controller P1 corresponding to the classification control step, a similar image display information generation controller P2 corresponding to the similar image display information generation control step, a thumbnail image generation controller P3 corresponding to the thumbnail image generation control step, a display controller P4 corresponding to the display control step, a reception controller P5, and an extraction controller P8. The controller 14 of the mobile terminal device 10 transmits the finally selected image data IM to the image forming apparatus 100, and the image forming apparatus 100 prints the received image data IM.

The disclosure is not limited to the embodiments described above and can be implemented in various other forms. Thus, the above embodiments are merely examples in all respects and should not be interpreted as limiting. The scope of the disclosure is indicated by the claims and is not limited to the description. Furthermore, all modifications and changes equivalent in scope with the claims are included in the scope of the disclosure.

The invention claimed is:

1. An image forming apparatus that prints a piece of image data selected from a plurality of pieces of image data that are input, the image forming apparatus comprising:
a controller,
wherein the controller classifies, among the plurality of pieces of image data, each subset of pieces of image data satisfying a predetermined classification condition for grouping similar images, as a group of a plurality of pieces of similar image data, classifies a piece of image data not satisfying the classification condition as a piece of normal image data, generates a piece of similar image display information corresponding to the group obtained by a classification for each group, generates a normal thumbnail image corresponding to the piece of normal image data obtained by the classification, and displays the generated piece of similar image display information and the generated normal thumbnail image in a manner that allows for selection operation,
the controller further receives a selection operation for the piece of similar image display information and the normal thumbnail image that are displayed, and if the received selection operation is for the piece of similar image display information, displays selection candidates for the plurality of pieces of similar image data in the group corresponding to the similar image display information in the manner that allows for selection operation, and
the controller further extracts, from among the plurality of pieces of similar image data in the group corresponding to the piece of similar image display information, a plurality of pieces of similar image data satisfying a predetermined extraction condition related to luminance and/or contrast ratio as a plurality of pieces of extracted similar image data, generates a plurality of extracted similar thumbnail images respectively corresponding to the plurality of pieces of extracted similar image data, and displays the plurality of extracted similar thumbnail images generated as the selection candidates in the manner that allows for selection operation.

2. The image forming apparatus according to claim 1, wherein the classification condition indicates whether a time interval of a creation date and time between the plurality of pieces of image data is shorter than a predetermined reference time interval.

3. The image forming apparatus according to claim 1, wherein the classification condition indicates whether one piece of the plurality of pieces of image data and another piece of the plurality of pieces of image data are similar to each other.

4. The image forming apparatus according to claim 1, wherein the similar image display information includes a number of the plurality of pieces of similar image data in the group.

5. The image forming apparatus according to claim 1, wherein the controller further generates a plurality of similar thumbnail images that respectively corresponds to the plurality of pieces of similar image data in the group, and
the piece of similar image display information includes at least a part of the plurality of similar thumbnail images generated.

6. The image forming apparatus according to claim 1, wherein the controller further generates a plurality of similar thumbnail images that respectively corresponds to the plurality of pieces of similar image data in the group corresponding to the piece of similar image display information, and displays the plurality of similar thumbnail images generated as the selection candidates in the manner that allows for selection operation.

7. A non-transitory computer-readable recording medium with an image processing program recorded thereon, the image processing program comprising one or more instructions that, when executed by at least one processor, cause the at least one processor to:

classify, among a plurality of pieces of image data, a plurality of pieces of image data satisfying a predetermined classification condition for grouping similar images as a group of a plurality of pieces of similar image data, and classify a piece of image data not satisfying the classification condition as a piece of normal image data;

generate a piece of similar image display information corresponding to the group obtained by a classification for each group;

generate a normal thumbnail image corresponding to the piece of normal image data obtained by the classification;

display the generated piece of similar image display information and the generated normal thumbnail image in a manner that allows for selection operation;

receive a selection operation for the piece of similar image display information and the normal thumbnail image that are displayed, and if the received selection operation is for the piece of similar image display information, display selection candidates for the plurality of pieces of similar image data in the group corresponding to the similar image display information in the manner that allows for selection operation; and extract from among the plurality of pieces of similar image data in the group corresponding to the piece of similar image display information, a plurality of pieces of similar image data satisfying a predetermined extraction condition related to luminance and/or contrast ratio as a plurality of pieces of extracted similar image data, generate a plurality of extracted similar thumbnail images respectively corresponding to the plurality of pieces of extracted similar image data, and display the plurality of extracted similar thumbnail images generated as the selection candidates in the manner that allows for selection operation.

8. An image processing method performed by at least one processor, the image processing method comprising:

classifying, among a plurality of pieces of image data, a plurality of pieces of image data satisfying a predetermined classification condition for grouping similar images as a group of a plurality of pieces of similar image data, and classifying a piece of image data not satisfying the classification condition as a piece of normal image data;

generating a piece of similar image display information corresponding to the group obtained by a classification for each group;

generating a normal thumbnail image corresponding to the piece of normal image data obtained by the classification;

displaying the generated piece of similar image display information and the generated normal thumbnail image in a manner that allows for selection operation;

receiving a selection operation for the piece of similar image display information and the normal thumbnail image that are displayed, and if the received selection operation is for the piece of similar image display information, displaying selection candidates for the plurality of pieces of similar image data in the group corresponding to the similar image display information in the manner that allows for selection operation; and extracting from among the plurality of pieces of similar image data in the group corresponding to the piece of similar image display information, a plurality of pieces of similar image data satisfying a predetermined extraction condition related to luminance and/or contrast ratio as a plurality of pieces of extracted similar image data, generating a plurality of extracted similar thumbnail images respectively corresponding to the plurality of pieces of extracted similar image data, and displaying the plurality of extracted similar thumbnail images generated as the selection candidates in the manner that allows for selection operation.

* * * * *